US005897054A

United States Patent [19]

Firth

[11] Patent Number: 5,897,054

[45] Date of Patent: Apr. 27, 1999

[54] DOOR IDENTIFICATION SYSTEM

[76] Inventor: Michael John Firth, 1 Apperley Lane, Rawdon Leeds, W. Yorkshire, United Kingdom, LS19 6DA

[21] Appl. No.: 08/910,518

[22] Filed: Aug. 7, 1997

[51] Int. Cl.[6] .......... B65G 11/04

[52] U.S. Cl. .......... 232/44; 232/19; 232/43.1; 109/19; 312/242

[58] Field of Search .......... 232/19, 43.1, 43.3, 232/43.4, 44; 109/19, 66; 312/330.1, 242, 327

[56] References Cited

U.S. PATENT DOCUMENTS

| | | | |
|---|---|---|---|
| D. 326,381 | 5/1992 | Heiligenthal et al. . | |
| 1,516,150 | 11/1924 | Craw | 232/43.4 X |
| 3,713,581 | 1/1973 | Mullens | 232/43.1 X |
| 4,119,269 | 10/1978 | Soderberg | 232/43.3 |
| 4,135,658 | 1/1979 | Hagberg | 232/43.1 |
| 4,149,474 | 4/1979 | Ruane | 232/43.3 X |
| 4,190,004 | 2/1980 | Richardson | 109/19 |
| 4,245,776 | 1/1981 | Miner | 232/43.3 |
| 4,393,789 | 7/1983 | Glotfelter | 109/19 |
| 4,517,901 | 5/1985 | Clark | 109/19 |
| 4,596,358 | 6/1986 | Hagberg | 232/43.1 |
| 4,640,200 | 2/1987 | Richardson | 109/19 |
| 4,648,550 | 3/1987 | Cleary, Jr. | 232/43.4 X |

*Primary Examiner*—Joanne Silbermann
*Assistant Examiner*—William L. Miller

[57] ABSTRACT

A new DOOR IDENTIFICATION SYSTEM for ALLOWING HOMEOWNERS TO RECEIVE AND VERIFY IDENTIFICATION FOR A PERSON KNOCKING ON THEIR DOOR. The inventive device includes an interior door sleeve positioned within a hole through a door. A sliding tray is slidably received within the interior door sleeve. The sliding tray includes an outwardly sliding portion and an inwardly sliding portion with a hinge disposed therebetween. A safety clip is secured to and extends upwardly from a front wall of the inwardly sliding portion of the sliding tray.

7 Claims, 2 Drawing Sheets

DOOR IDENTIFICATION SYSTEM

BACKGROUND OF THE INVENTION

1. Field of the Invention

The present invention relates to TRANSACTION DRAWERS and more particularly pertains to a new DOOR IDENTIFICATION SYSTEM for ALLOWING HOMEOWNERS TO RECEIVE AND VERIFY IDENTIFICATION FOR A PERSON KNOCKING ON THEIR DOOR.

2. Description of the Prior Art

The use of TRANSACTION DRAWERS is known in the prior art. More specifically, TRANSACTION DRAWERS heretofore devised and utilized are known to consist basically of familiar, expected and obvious structural configurations, notwithstanding the myriad of designs encompassed by the crowded prior art which have been developed for the fulfillment of countless objectives and requirements.

Known prior art TRANSACTION DRAWERS include U.S. Pat. No. 4,190,004 to Richardson; U.S. Pat. No. 4,640,200 to Richardson; U.S. Pat. No. Des. 326,381 to Heiligenthal et al.; U.S. Pat. No. 4,393,789 to Glotfelter; U.S. Pat. No. 4,517,901 to Clark; and U.S. Pat. No. 4,135,658 to Hagberg.

While these devices fulfill their respective, particular objectives and requirements, the aforementioned patents do not disclose a new DOOR IDENTIFICATION SYSTEM. The inventive device includes an interior door sleeve positioned within a hole through a door. A sliding tray is slidably received within the interior door sleeve. The sliding tray includes an outwardly sliding portion and an inwardly sliding portion with a hinge disposed therebetween. A safety clip is secured to and extends upwardly from a front wall of the inwardly sliding portion of the sliding tray.

In these respects, the DOOR IDENTIFICATION SYSTEM according to the present invention substantially departs from the conventional concepts and designs of the prior art, and in so doing provides an apparatus primarily developed for the purpose of ALLOWING HOMEOWNERS TO RECEIVE AND VERIFY IDENTIFICATION FOR A PERSON KNOCKING ON THEIR DOOR.

SUMMARY OF THE INVENTION

In view of the foregoing disadvantages inherent in the known types of TRANSACTION DRAWERS now present in the prior art, the present invention provides a new DOOR IDENTIFICATION SYSTEM construction wherein the same can be utilized for ALLOWING HOMEOWNERS TO RECEIVE AND VERIFY IDENTIFICATION FOR A PERSON KNOCKING ON THEIR DOOR.

The general purpose of the present invention, which will be described subsequently in greater detail, is to provide a new DOOR IDENTIFICATION SYSTEM apparatus and method which has many of the advantages of the TRANSACTION DRAWERS mentioned heretofore and many novel features that result in a new DOOR IDENTIFICATION SYSTEM which is not anticipated, rendered obvious, suggested, or even implied by any of the prior art TRANSACTION DRAWERS, either alone or in any combination thereof.

To attain this, the present invention generally comprises an interior door sleeve positioned within a hole through a door. The door sleeve has a generally rectangular configuration. The door sleeve has an open outer end and an open inner end. The open inner end has a peripheral flange disposed therearound. An upper portion of the peripheral flange has a pair of apertures therethrough for receiving screws to secure the door sleeve within the door. A sliding tray is slidably received within the interior door sleeve. The sliding tray includes an outer portion and an inner portion. The outer portion has an outer wall positioned outwardly of the interior door sleeve. The outer wall has dimensions greater than dimensions of the open outer end of the door sleeve. The outer portion includes a bottom wall extending inwardly from the outer wall. A pair of side walls extend upwardly from opposing side edges of the bottom wall. The inner portion is hingedly coupled with respect to the outer portion. The inner portion includes a bottom wall hingedly coupled with the bottom wall of the outer portion. A pair of side walls extend upwardly from opposing side edges of the bottom wall of the inner portion. A front wall extends upwardly from a front edge of the bottom wall of the inner portion and is integrally formed with the side walls thereof. A safety clip is secured to and extends upwardly from the front wall of the inner portion of the sliding tray.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature an essence of the technical disclosure of the application. The abstract is neither intended to define the invention of the application, which is measured by the claims, nor is it intended to be limiting as to the scope of the invention in any way.

It is therefore an object of the present invention to provide a new DOOR IDENTIFICATION SYSTEM apparatus and method which has many of the advantages of the TRANSACTION DRAWERS mentioned heretofore and many novel features that result in a new DOOR IDENTIFICATION SYSTEM which is not anticipated, rendered obvious, suggested, or even implied by any of the prior art TRANSACTION DRAWERS, either alone or in any combination thereof.

It is another object of the present invention to provide a new DOOR IDENTIFICATION SYSTEM which may be easily and efficiently manufactured and marketed.

It is a further object of the present invention to provide a new DOOR IDENTIFICATION SYSTEM which is of a durable and reliable construction.

An even further object of the present invention is to provide a new DOOR IDENTIFICATION SYSTEM which is susceptible of a low cost of manufacture with regard to both materials and labor, and which accordingly is then susceptible of low prices of sale to the consuming public, thereby making such DOOR IDENTIFICATION SYSTEM economically available to the buying public.

Still yet another object of the present invention is to provide a new DOOR IDENTIFICATION SYSTEM which provides in the apparatuses and methods of the prior art some of the advantages thereof, while simultaneously overcoming some of the disadvantages normally associated therewith.

Still another object of the present invention is to provide a new DOOR IDENTIFICATION SYSTEM for ALLOWING HOMEOWNERS TO RECEIVE AND VERIFY IDENTIFICATION FOR A PERSON KNOCKING ON THEIR DOOR.

Yet another object of the present invention is to provide a new DOOR IDENTIFICATION SYSTEM which includes an interior door sleeve positioned within a hole through a door. A sliding tray is slidably received within the interior door sleeve. The sliding tray includes an outwardly sliding portion and an inwardly sliding portion with a hinge disposed therebetween. A safety clip is secured to and extends upwardly from a front wall of the inwardly sliding portion of the sliding tray.

Still yet another object of the present invention is to provide a new DOOR IDENTIFICATION SYSTEM that will prevent crime.

Even still another object of the present invention is to provide a new DOOR IDENTIFICATION SYSTEM that provides a water tight seal with respect to a door.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
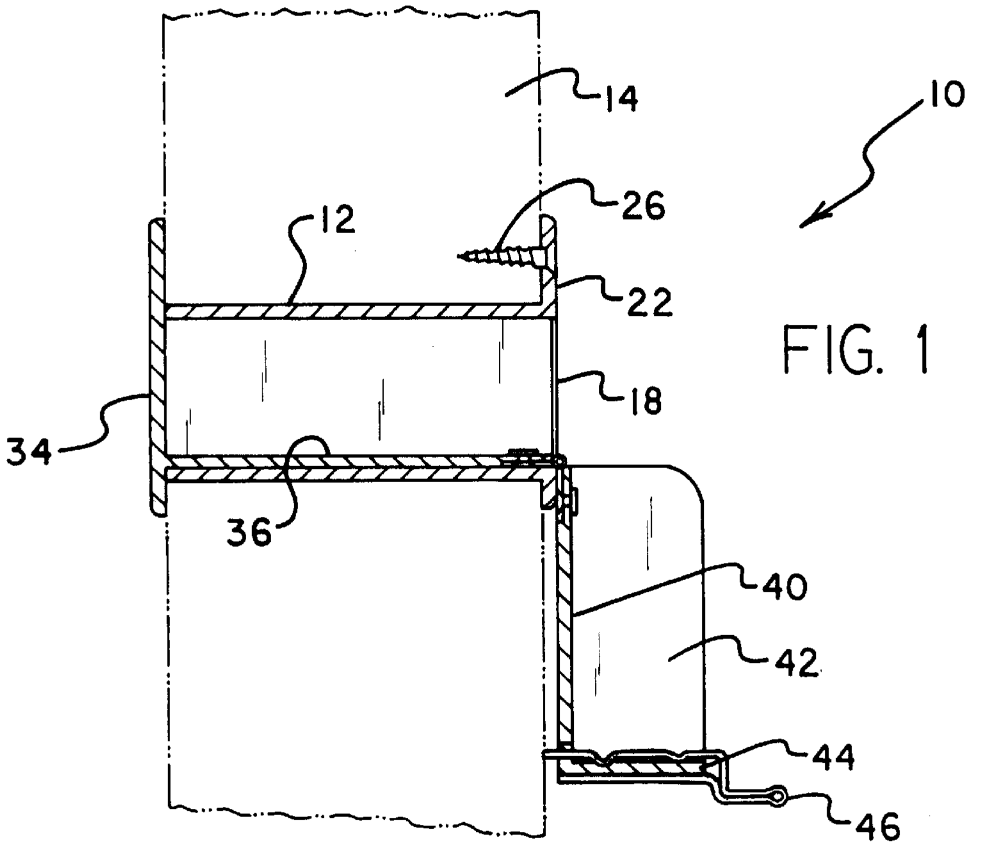
FIG. 1 is a cross-sectional side view of a new DOOR IDENTIFICATION SYSTEM according to the present invention shown in a closed orientation.
Figure 2:
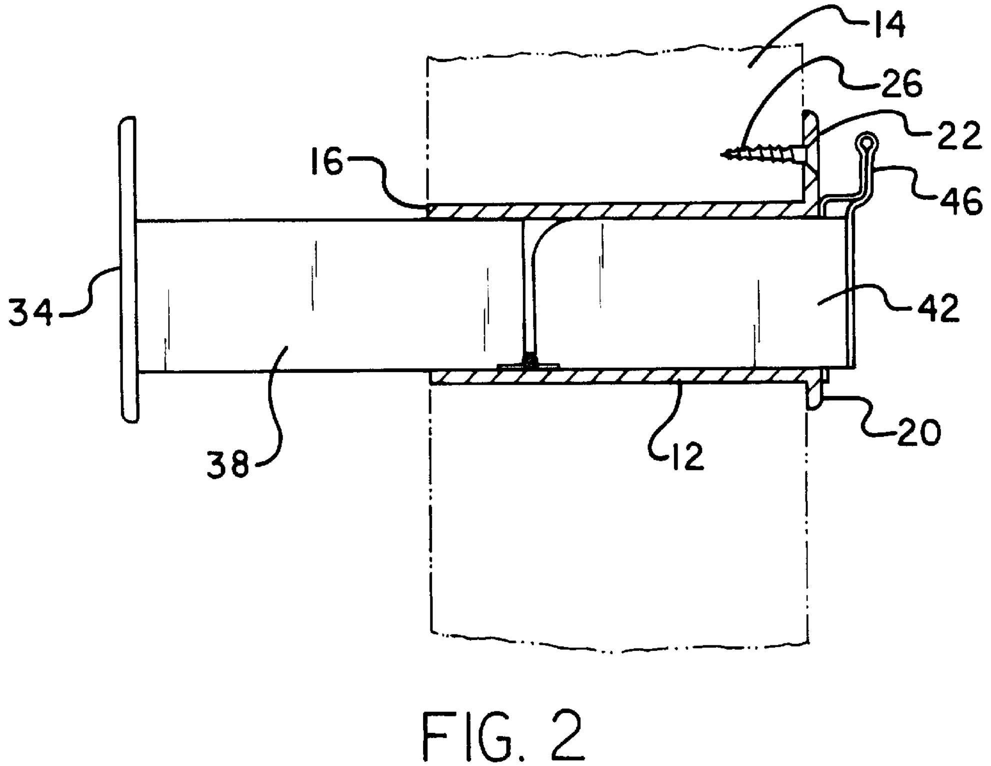
FIG. 2 is a cross-sectional side view of the present invention shown in an open orientation.
Figure 3:
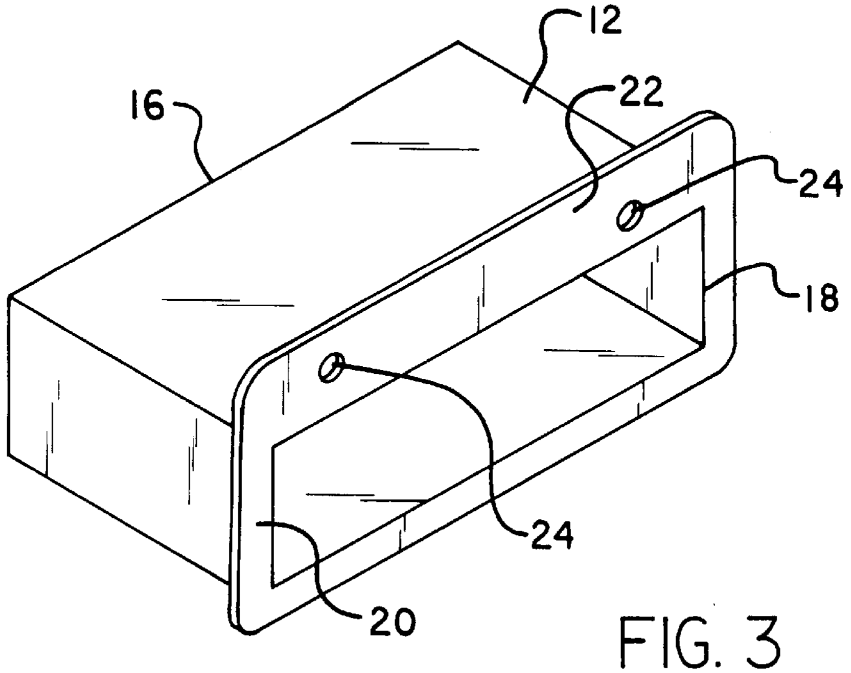
FIG. 3 is a perspective view of the door sleeve of the present invention.
Figure 4:
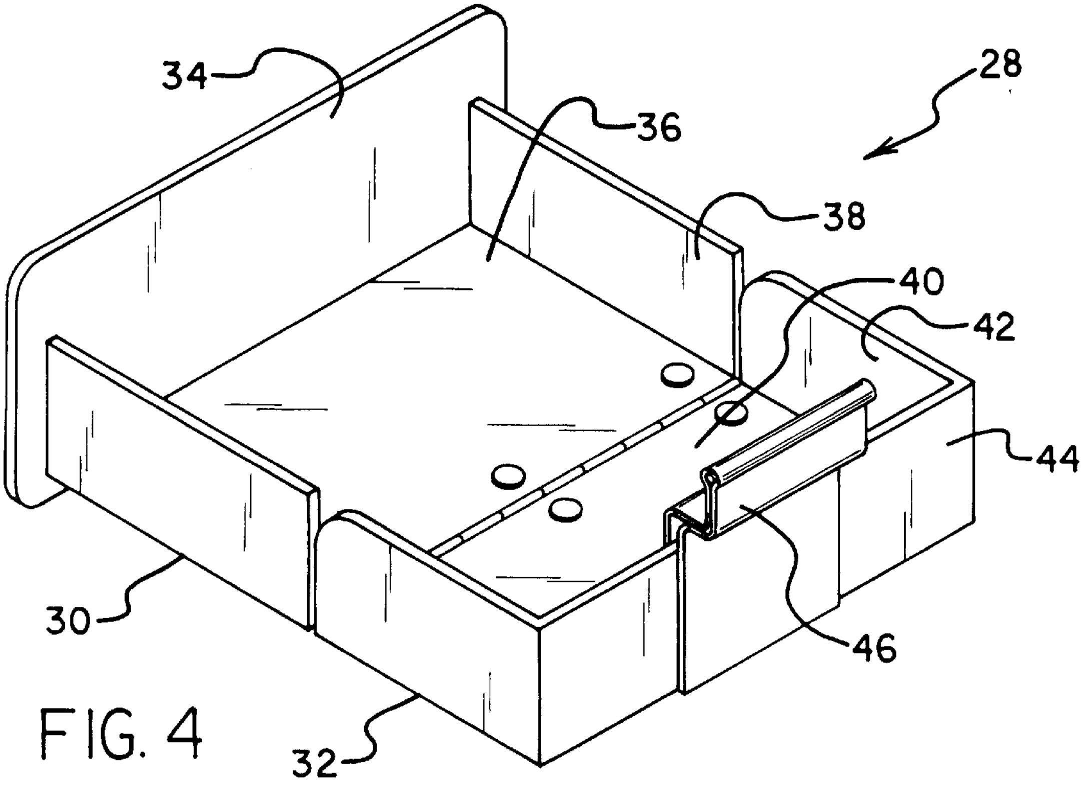
FIG. 4 is a perspective view of the sliding tray of the present invention.

With reference now to the drawings, and in particular to FIGS. 1 through 4 thereof, a new DOOR IDENTIFICATION SYSTEM embodying the principles and concepts of the present invention and generally designated by the reference numeral 10 will be described.

As best illustrated in FIGS. 1 through 6, the DOOR IDENTIFICATION SYSTEM 10 comprises an interior door sleeve 12 positioned within a hole through a door 14. The door sleeve 12 has a generally rectangular configuration. Note FIG. 3. The door sleeve 12 has an open outer end 16 and an open inner end 18. The open inner end 18 has a peripheral flange 20 disposed therearound. An upper portion 22 of the peripheral flange 20 has a pair of apertures 24 therethrough for receiving screws 26 to secure the door sleeve 12 within the door 14.

A sliding tray 28 is slidably received within the interior door sleeve 12. The sliding tray 28 includes an outer portion 30 and an inner portion 32. The outer portion 30 has an outer wall 34 positioned outwardly of the interior door sleeve 12. The outer wall 34 has dimensions greater than dimensions of the open outer end 16 of the door sleeve 12. The outer portion 30 includes a bottom wall 36 extending inwardly from the outer wall 34. A pair of side walls 38 extend upwardly from opposing side edges of the bottom wall 36. The inner portion 32 is hingedly coupled with respect to the outer portion 30. The inner portion 32 includes a bottom wall 40 hingedly coupled with the bottom wall 36 of the outer portion 30. A pair of side walls 42 extend upwardly from opposing side edges of the bottom wall 40 of the inner portion 32. A front wall 44 extends upwardly from a front edge of the bottom wall 40 of the inner portion 32 and is integrally formed with the side walls 42 thereof.

A safety clip 46 is secured to and extends upwardly from the front wall 44 of the inner portion 32 of the sliding tray 28.

In use, the device 10 slides through an opening in a front door 14 to accept the identification of a person at the door. The homeowner could then slide the sliding tray 28 back inside to verify the validity of the person's identification. When not in use, the sliding tray 28 can be folded so that the inner portion 32 hangs down on the inside of the door 14. The outer wall 34 of the outer portion 30 would be flush against the open outer end 16 of the door sleeve 12 to create an air tight seal. The outer wall 34 also prevents the sliding tray 28 from being pushed completely inward thereby falling out on the opposing side. The safety clip 46 prevents the sliding tray 28 from being pulled completely out of the door sleeve 12 by a person on the outside of the door 14.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A door identification system for allowing homeowners to receive and verify identification for a person knocking on a door comprising, in combination:

the door;

an interior door sleeve positioned within a hole through the door, the door sleeve having a generally rectangular configuration, the door sleeve having an open outer end and an open inner end, the open inner end having a peripheral flange disposed therearound, an upper portion of the peripheral flange having a pair of apertures therethrough for receiving screws to secure the door sleeve within the door;

a sliding tray slidably received within the interior door sleeve, the sliding tray including an outer portion and an inner portion, the outer portion having an outer wall positioned outwardly of the interior door sleeve, the outer wall having dimensions greater than dimensions of the open outer end of the door sleeve, the outer portion including a bottom wall extending inwardly from the outer wall, a pair of side walls extending upwardly from opposing side edges of the bottom wall, the inner portion hingedly coupled with respect to the outer portion, the inner portion including a bottom wall hingedly coupled with the bottom wall of the outer portion, a pair of side walls extending upwardly from opposing side edges of the bottom wall of the inner portion, a front wall extending upwardly from a front edge of the bottom wall of the inner portion and integrally formed with the side walls thereof; and a safety clip secured to and extending upwardly from the front wall of the inner portion of the sliding tray.

2. A door identification system for allowing homeowners to receive and verify identification for a person knocking on a door comprising, in combination:

the door;

an interior door sleeve positioned within a hole through the door;

a sliding tray slidably received within the interior door sleeve, the sliding tray including an outwardly sliding portion and an inwardly sliding portion with a hinge disposed therebetween;

a first end of the hinge being coupled to and extending outwardly from a perimeter edge of the outwardly sliding portion, a second end of the hinge opposite the first end being coupled to and extending outwardly from a perimeter edge of the inwardly sliding portion such that the outwardly sliding portion perimeter edge and the inwardly sliding portion perimeter edge are substantially horizontally aligned and the hinge extends along the entire perimeter edge of the inwardly sliding portion and the outwardly sliding portion; and a safety clip secured to and extending upwardly from a front wall of the inwardly sliding portion of the sliding tray.

3. The door identification system as set forth in claim 2 wherein the door sleeve has a generally rectangular configuration, the door sleeve has an open outer end and an open inner end, the open inner end has a peripheral flange disposed therearound.

4. The door identification system as set forth in claim 3 wherein an upper portion of the peripheral flange has a pair of apertures therethrough for receiving screws to secure the door sleeve within the door.

5. The door identification system as set forth in claim 2 wherein the outwardly sliding portion has an outer wall positioned outwardly of the interior door sleeve, the outer wall having dimensions greater than dimensions of an open outer end of the door sleeve.

6. The door identification system as set forth in claim 5 wherein the outwardly sliding portion includes a bottom wall extending inwardly from the outer wall, a pair of side walls extending upwardly from opposing side edges of the bottom wall.

7. A door identification system for allowing homeowners to receive and verify identification for a person knocking on a door comprising, in combination:

the door;

an interior door sleeve positioned within a hole through the door;

a sliding tray slidably received within the interior door sleeve, the sliding tray including an outwardly sliding portion and an inwardly sliding portion with a hinge disposed therebetween;

a safety clip secured to and extending upwardly from a front wall of the inwardly sliding portion of the sliding tray;

wherein the outwardly sliding portion has an outer wall positioned outwardly of the interior door sleeve, the outer wall having dimensions greater than dimensions of an open outer end of the door sleeve;

wherein the outwardly sliding portion includes a bottom wall extending inwardly from the outer wall, a pair of side walls extending upwardly from opposing side edges of the bottom wall; and wherein the inwardly sliding portion includes a bottom wall hingedly coupled with the bottom wall of the outwardly sliding portion, a pair of side walls extending upwardly from opposing side edges of the bottom wall of the inwardly sliding portion, the front wall extending upwardly from a front edge of the bottom wall of the inwardly sliding portion and integrally formed with the side walls thereof.

* * * * *